May 7, 1935.  C. W. BRISTOL ET AL  2,000,739
CONTROLLER APPARATUS
Filed Aug. 29, 1933  2 Sheets-Sheet 1
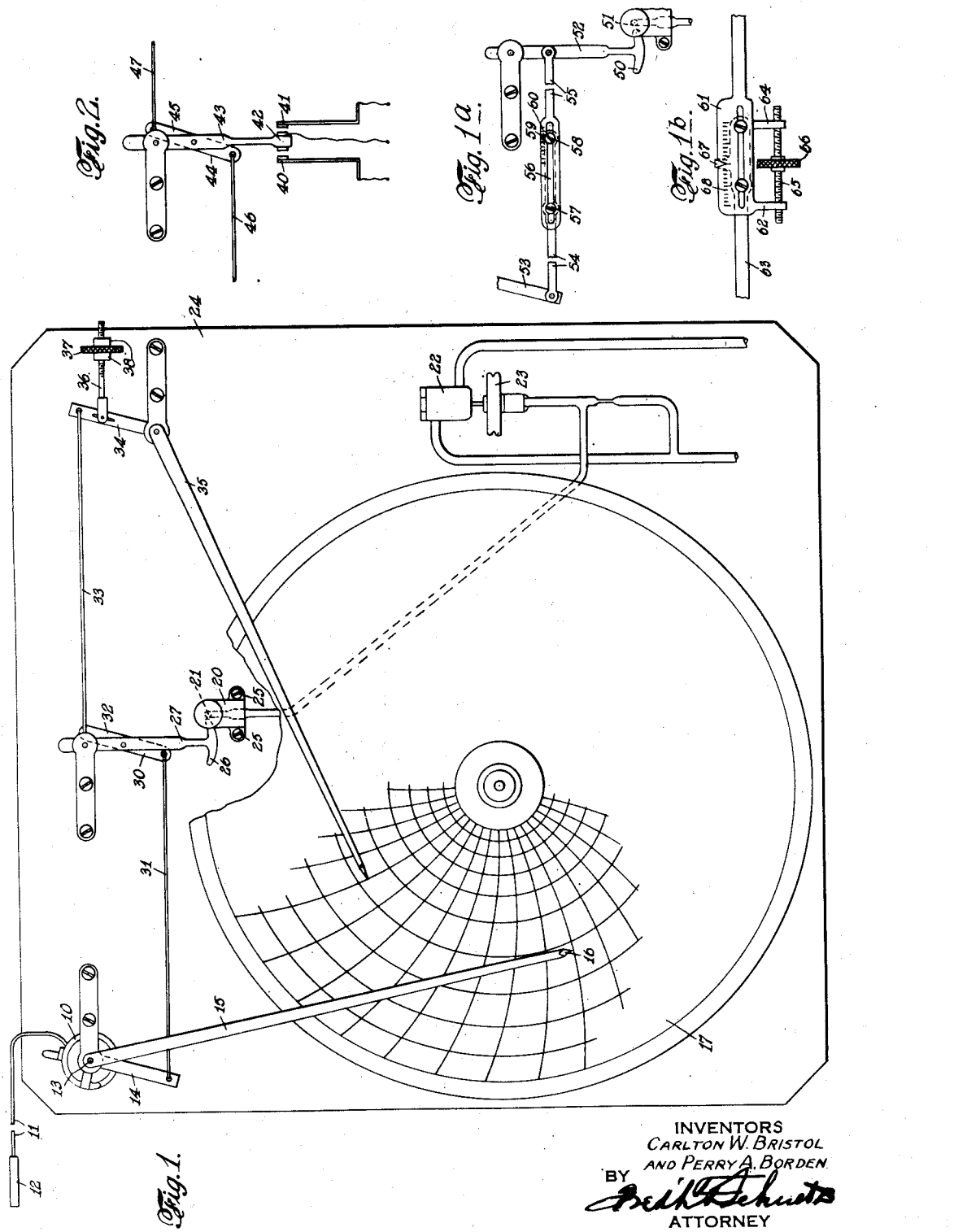
INVENTORS
CARLTON W. BRISTOL
AND PERRY A. BORDEN
BY
ATTORNEY May 7, 1935.  C. W. BRISTOL ET AL  2,000,739
CONTROLLER APPARATUS
Filed Aug. 29, 1933  2 Sheets-Sheet 2
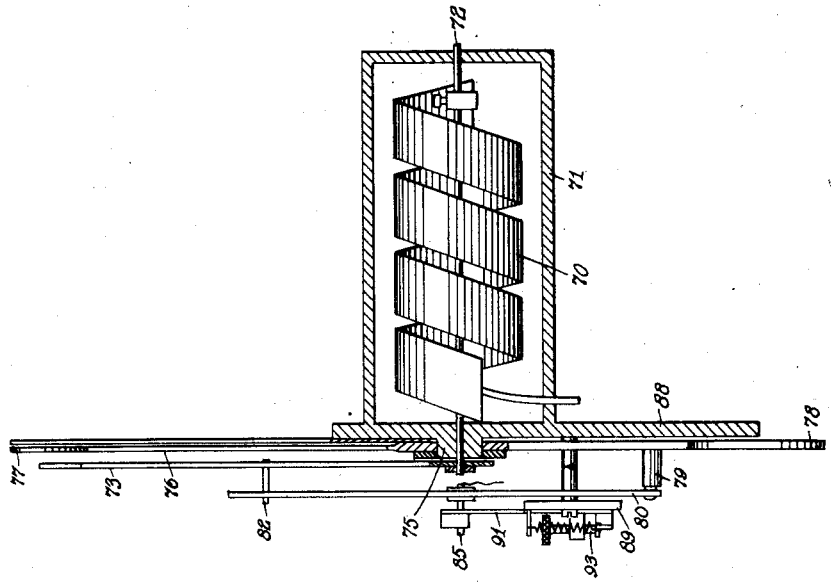
INVENTORS
CARLTON W. BRISTOL
AND PERRY A. BORDEN
BY
ATTORNEY Patented May 7, 1935

2,000,739

UNITED STATES PATENT OFFICE 2,000,739

CONTROLLER APPARATUS

Carlton W. Bristol, Naugatuck, and Perry A. Borden, Waterbury, Conn., assignors to The Bristol Company, Waterbury, Conn., a corporation of Connecticut Application August 29, 1933, Serial No. 687,328

15 Claims. (Cl. 236—82)

The invention relates to control apparatus, and more particularly to control apparatus of the type wherein a control couple is provided having an element actuated by means responsive to changes in magnitude of the condition to be controlled. The couple of an apparatus of this nature is so arranged, furthermore, as to afford adjustment or setting of the control point to various positions within the range of the apparatus.

It has been the practice heretofore to provide for adjustment of the "fixed" element of the couple, either manually or by automatic mechanism designed to carry the variable condition through a definite and predetermined cycle of values, or to provide compensation for other variables in the system. This control couple may be of the electrical or pneumatic controlling type, for example, as set forth in U. S. Letters Patent #1,225,758 and #1,880,247, respectively.

In view of the adjustment of the "fixed" or normally stationary member of these couples the use of absolutely rigid connections is prohibited, and recourse must be had to flexible tubes, sliding joints, swivel bearings, or equivalent expedients. While this is not so objectionable in the case of controllers of the electrical type wherein the leads to the "fixed" member readily lend themselves to an adjustment, with fluid medium connections it is difficult if not practically impossible to avoid friction or leakage. This, of course, is highly undesirable and may also introduce errors due to the variable nature of the rate at which the fluid, for example, is then bled from the control system.

It is an object of the present invention to provide for a control couple in which the required adjustment is applied solely to the movable member of the couple so that the fixed member is not only nominally but actually fixed. This permits of its being permanently attached to the frame or other fixed part of the apparatus.

The invention has for a further object to indicate and/or record through a suitable measuring member the setting of the adjustment and particularly on a scale which may be common to the said adjustment and the responses of the responsive element and whereby, if desired, a graphic record may be secured not only of the magnitude of the condition under control but as well of the various settings of the adjustment. This is of value in proportioning and setting initially the elements of the control couple and other parts of the mechanism such that the value toward which control will be effected will agree with the setting of the measuring element of the adjusting mechanism.

In carrying out the invention, there is associated with an element responsive to changes in magnitude of a condition to be controlled and measured, a control couple wherein the fixed or normally stationary member is arranged to permanently maintain its position and the associated movable element, actuated from the responsive element, is, contrary to the usual practice, arranged to be given a movement relatively to said responsive element and the fixed member so as to afford the desired adjustment in the action of the control couple. This adjustment may be effected manually or automatically; and novel means are provided to this end and embodying an arm or a differential lever for the movable control member of the couple which is connected with the responsive element and also with suitable means for moving and setting the same in the adjustment thereof.

The nature of the invention, however, will best be understood when described in connection with the accompanying drawings, in which:

Fig. 1 is a front elevation of an instrument embodying the novel control couple and of the pneumatic type of control apparatus for use, for example, in the control and maintenance of temperatures.

Figs. 1a and 1b are fragmentary views illustrating modifications in the adjusting means for the control couple.

Fig. 2 is a fragmentary elevation illustrating a modification in the control couple.

Fig. 3 is a front elevation and Fig. 4 a transverse vertical section therethrough illustrating the application of the novel control couple to an electric type of controller apparatus.

Referring to Fig. 1 of the drawings, 10 designates a pressure-spring or Bourdon tube responsive element of the conventional type and adapted to be actuated, through the capillary tube 11 and closed bulb 12, by the expansion and contraction of a fluid contained in the said bulb which is exposed to the condition to be controlled, for example, a temperature condition. One end of the said pressure-spring 10 is attached to, and actuates, a spindle 13 carrying a control arm 14 as well as the pen-arm 15 for indicating and/or recording the extent of angular movement of said spindle. If desired, a pen 16 or other marking member carried at the extremity of the arm 15 may be caused to trace a record upon a moving surface such as the rotating circular chart 17 indicated. With the exception of the control arm 14, the foregoing description relates substantially to the conventional type of recording thermometer.

The invention, however, is concerned more especially with the means for effecting control of a temperature condition to which the bulb 12 is exposed, and particularly with respect to the adjustment of the control point. Any suitable control couple of well known or special design and operating either pneumatically or electrically may serve for the control of the condition; and such control couple embodies generally a member movable with the responsive element and a cooperating member which is arranged to be adjusted relatively to the movable member to alter the control point.

In accordance with the present invention, however, provision is made for effecting the adjustment by suitably shifting the movable member of the control couple so that the normally stationary or fixed member thereof will remain permanently fixed and the difficulties inherent in effecting connection to a movable element will be obviated.

Thus, the control couple, in the particular embodiment shown in Fig. 1 which is of the pneumatic type, comprises a permanently fixed member 20 having the orifices 21 for bleeding fluid from a relay valve 22 operating the control valve 23 as is well understood. The orifice member 20 may be permanently fixed, for example to the instrument plate 24, as by screwing the same thereto by the screws 25.

The cooperating member of this control couple is in the nature of a vane 26 carried by a differential lever 27 which is designed to move with the spindle 13 through a connection, as hereinafter set forth, with its arm 14. The amount of fluid supply bled will therefore be in proportion to the extent that vane 26 cooperates with the orifices 21, all of which is more fully set forth in U. S. Letters Patent #1,880,247 granted to applicants' assignee.

Connection is not made, however, directly from the arm 14 to the lever 27, but the latter carries and provides a fulcrum for a floating lever whose one arm 30 is connected through a link 31 with the said arm 14 of the responsive element. The other arm 32 of the floating lever is connected through a link 33 to a crank-arm 34 which constitutes, preferably, one arm of a bell-crank type lever whose other arm 35 is in the nature of an indicating or recording element to indicate and/or record upon the common movable surface 17 the particular position of the crank-arm 34 and is a measure of the adjustment setting.

To effect an adjustment of the lever 27 through the mechanism hereinbefore noted, provision is made for rocking the arm 34 to the required extent, for example, by attaching thereto a threaded rod 36 upon which runs a knurled nut 37 positioned between the tines 38 of a bifurcated bracket attached to the instrument plate 24. This provides a locking micrometer adjustment of the position of arm 34 and thereby of the arm 32, the extent of which adjustment or setting will be reflected by the position of the pointer or recording element 35.

The operation of adjustment of the vane 26 is as follows: Assuming the link 33 to be held stationary, any transverse movement of the link 31, due to angular motion of the arm 14, will cause the floating lever 30 to function as a lever of the second class and cause the lever 27 with its vane 26 to swing through an angle substantially proportional to that described by the arm 14. This opens or closes the vents of the orifice member as the measured temperature varies through a small range; and effective control is obtained thereby, all of which is more fully set forth in the aforesaid Letters Patent.

The temperature at which equilibrium is established, namely, the "control point", will be governed by the temperature value at which the vane member 26 coacts with the orifice member 20 to restrict the escape of fluid therethrough. So long as the link 33 remains in its set stationary position, the control point will remain fixed and control will be had toward a definite temperature as determined by the pressure-spring 10 of which a record is effected on the chart by the pen-arm 15.

If, however, link 33 be moved in the direction of its longitudinal axis, through angular movement of its attached arm 34, the upper arm 32 of the floating lever 30 will assume a new position and the relationship between the differential lever 27, or rather its vane 26, and the spring element 10 will be changed, with the result that control will be effected toward a new value. Thus, by varying the setting of the arm 34, as by means of the nut 37, the control point may be shifted to any desired value within the range of the instrument. Furthermore, the length of the links 31 and 33 and the proportioning of the other parts of the mechanism is to be made such that the value toward which control will be effected will agree with the setting of the pointer 35 on the chart 17. It is to be noted, also, that the adjustment effected in the foregoing manner does not change the ratio of leverage in the floating lever but merely shifts the fulcrum.

The foregoing method of adjustment is equally applicable to electrical control as the orifice member and vane member constituting the control couple of the hereinbefore described embodiment may be replaced, Fig. 2, by a pair of fixed contacts 40 and 41 and a movable contact 42, respectively, the former contacts being located upon opposite sides of the movable contact to cooperate therewith.

In this arrangement, the movable contact 42 is carried by the differential lever 43 upon which there is mounted, similarly to the previous embodiment, a floating lever having the arms 44 and 45 to which are connected also the responsive element link 46 and the adjustment link 47, respectively.

Furthermore, provision may be made for effecting the adjustment of the movable member of the control couple within its connection to the responsive element rather than by the additional mechanism hereinbefore described. Thus, reference being had to Fig. 1a, the movable member 50, which cooperates with the fixed member 51 of the control couple, is carried by a pivoted arm 52 connected by a jointed link to the responsive element arm 53. Adjustment mechanism for pivoted arm 52 is provided in this jointed link whose effective length may thereby be varied to change the position of member 50 relatively to member 51 and thus effect the desired control setting. To this end, the link is composed of two portions 54 and 55, the latter, for example, being provided with the longitudinal slot 56 within which are adapted to ride pins or screws 57 and 58 for changing the effective length of the link as a whole and extending outwardly from the other portion 54 of the link. One of the screws, moreover, as the screw 58, may carry an indicator 59 for cooperation with a scale 60 on the slotted portion 55 to serve as a means for indicating the adjustment. Other expedients for varying the effective length of the link connecting the movable member arm with the arm of the responsive element may be resorted to.

For example, as indicated in Fig. 1b, the slotted portion 61 of the link is provided with a projecting arm 62 and similarly the cooperating pin portion 63 with a projecting arm 64. Both of these arms 62 and 64 are threaded, the threads, however, running in opposite directions and there being threaded into the same a spindle 65 which may be turned by knurled wheel 66 for bringing the two link portions together or separating the same, as is well understood. A pointer element 67 carried by the portion 63 cooperates with a scale 68 provided on the portion 61 to indicate the setting.

In connection with the electrically operated type of controller, a particularly satisfactory from is set forth in Figs. 3 and 4. As indicated, the measuring unit shown therein includes a pressure tube or helical spring element 70 which is enclosed in a housing 71 and is designed to impart angular movement to a shaft 72, rotatably mounted in the housing, and in response to variations in the condition to which the actuating fluid of the tube is subjected. Shaft 72 carries at its outer end an indicating pointer 73 adapted to traverse and indicate upon a graduated scale 74 in the conventional manner. Concentric with the shaft 72, and frictionally engaging with a hub 75 of the housing is an adjustable arm 76 having a "spotter" 77 traversing the scale 74 and indicating thereon. The opposite end of the arm 76 terminates in an adjusting handle 78 adaptable to manual operation. There is mounted upon this end of the arm a bearing member 79 upon which is pivoted a lever 80 having in its remote end a slot 81 into which extends a pin 82 projecting outwardly from the pointer arm 73 and at a radius from the shaft 72 equal to that at which the bearing member 79 is located. At the middle point of this lever 80 is mounted an electric contact pin or the like 85 which is insulated therefrom and is connected by a flexible lead 86 to a suitable terminal post 87 on the frame or plate 88 of the instrument.

There is also carried by the frame plate 88 an insulating plate 89 upon which are disposed contact arms 90 and 91 symmetrically disposed about the center line of the instrument, that is to say, about the shaft 72. These contacts are normally held against stops 92 and 93, respectively, being spring-drawn, as indicated, so as to yield under contact with the contact pin 85. The adjustment of these contacts 90 and 91 is such that they clear the contact pin 85 when it is in line with the center of spindle 72. The two contacts 90 and 91 are connected by flexible leads 94 and 95, respectively, to terminal posts 96 and 97 secured to the plate 88 and suitably insulated therefrom. These terminal posts, it will be understood, connect the instrument into the control system.

In the operation of the instrument, it will be appreciated that so long as the pointer 73 and arm 76 are in alignment with each other, whatever their common indication on the scale 74, the contact pin 85 will lie upon the center line of the spindle 72 and will therefore be in a neutral position between, and out of contact with, the contact arms 90 and 91. As the measured magnitude, as indicated by the pointer 73, deviates from the setting of the "spotter" 77, as indicated in Fig. 3 of the drawings, the contact pin 85 will engage one or the other of the contact arms, in the present instance the arm 90. This establishes an electrical circuit which may be utilized to operate a valve or magnetic contactor (not shown) or other well known means and whereby there will be effected a flow of a medium tending to nullify the deviation, and as is well understood in the art.

We claim:

1. In combination: an element responsive to changes in magnitude of a condition to be controlled and measured and means to measure the response of said element to changes in magnitude of the condition, a control couple embodying a contact member movable with the measuring means and a cooperating member having two contacts located upon opposite sides of the movable contact member to cooperate therewith, a setting arm, and a lever pivotally carried thereby adapted for engagement with the measuring means and bearing the said movable contact member.

2. In combination: an element responsive to changes in magnitude of a condition to be controlled and measured and means to measure the response of said element to changes in magnitude of the condition, an angularly movable setting element, a measuring element movable about the axis of movement of the setting element to measure the responses of the responsive element, a pair of contacts secured upon opposite sides of said center of angular movement, an arm pivotally carried by the setting element, a contact carried by said arm between the two said contacts, and means connecting said arm with the measuring element.

3. In combination: an element responsive to changes in magnitude of a condition to be controlled and measured and means to measure the response of said element to changes in magnitude of the condition, a control couple embodying a member movable with the responsive element and a cooperating and fixed member for a control medium, means to adjust the movable member of the control couple relatively to its cooperating fixed member, means to measure the setting of the adjustment of the movable member of the couple including a measuring element movable with the means for adjusting the movable member, and a surface common to the two measuring elements and with which they are adapted to cooperate for measuring thereon respectively the position of the responsive element measuring element and the adjusting means measuring element.

4. In combination: an element responsive to changes in magnitude of a condition to be controlled and measured and means to measure the response of said element to changes in magnitude of the condition, a control couple embodying a member movable wtih the responsive element and a cooperating and fixed member for a control medium, means to adjust the movable member of the control couple relatively to its cooperating fixed member, means to measure the setting of the adjustment of the movable member of the couple including a measuring element movable with the means for adjusting the movable member, and a movable chart common to the two measuring elements and with which they are adapted to cooperate for measuring thereon respectively the position of the responsive element measuring element and the adjusting means measuring element.

5. In combination: an element responsive to changes in magnitude of a condition to be controlled and measured and means to measure the response of said element to changes in magnitude of the condition, a control couple embodying a member movable with the responsive element and a cooperating and fixed member for a control medium, means to adjust the movable member of the control couple relatively to its cooperating fixed member, means to measure the setting of the adjustment of the movable member of the couple including a measuring element movable with the means for adjusting the movable member, and a surface common to the two measuring elements and with which they are adapted to cooperate, said surface having scale indications common to the two measuring elements, which are of equal radius but operating at different portions of the surface, for measuring thereon respectively the position of the responsive element measuring element and the adjusting means measuring element.

6. In combination: an element responsive to changes in magnitude of a condition to be controlled and measured and means to measure the response of said element to changes in magnitude of the condition, a control couple embodying a differential lever and a cooperating and fixed member, a floating lever carried by the differential lever, means for adjusting the floating lever, a connection between one arm of the floating lever and the responsive element, and a connection between the other arm of said floating lever and the means for effecting an adjustment of said floating lever.

7. In combination: an element responsive to changes in magnitude of a condition to be controlled and measured and means to measure the response of said element to changes in magnitude of the condition, a control couple embodying a differential lever and a cooperating and fixed member, a floating lever carried by the differential lever, a movable arm, means attached thereto to effect angular movement thereof, a connection between one arm of the floating lever and the responsive element, and means connecting said movable arm with the other arm of the floating lever.

8. In combination: an element responsive to changes in magnitude of a condition to be controlled and measured and means to measure the response of said element to changes in magnitude of the condition, a control couple embodying a differential lever and a cooperating and fixed member, a floating lever carried by the differential lever, a bell-crank, means connected to one arm thereof to angularly move the same, a connection between one arm of the floating lever and the responsive element, means connecting said bell-crank arm with the other arm of the floating lever, and measuring means connected with the other arm of the said bell-crank for measuring the setting of the adjustment of said bell-crank.

9. Adjustment mechanism for the movable element of a control couple having a fixed element cooperating therewith, and means responsive to changes in magnitude of a condition, said mechanism including mechanical differential means, and an adjusting member, the latter being connected mechanically to one end of the differential means whose other end affords a connection between the said movable element of the control couple and the said responsive means.

10. Adjustment mechanism for the movable element of a control couple having a fixed element cooperating therewith, and means responsive to changes in magnitude of a condition, said mechanism including mechanical differential means, and an adjusting member, the latter being connected mechanically to one end of the differential means whose other end affords a connection between the said movable element of the control couple and the said responsive means, and means to measure the degree of adjustment.

11. Adjustment mechanism for the movable element of a control couple having a fixed element having an orifice with which the movable member is adapted to cooperate in bleeding a fluid supply, and means responsive to changes in magnitude of a condition, said mechanism including mechanical differential means, and an adjusting member, the latter being connected mechanically to one end of the differential means whose other end affords a connection between the said movable element of the control couple and the said responsive means.

12. In combination: an element responsive to changes in magnitude of a condition to be controlled and measured and means to measure the response of said element to changes in magnitude of the condition, a control couple embodying a movable member and a cooperating fixed member having an orifice with which the movable couple is adapted to cooperate in bleeding a fluid supply, means for adjusting the position of the movable member relatively to said orifice, and differential mechanism having a part normally stationary and adapted for movement by the said adjusting means, said differential mechanism serving to connect the adjusting means to said movable member and the latter with the responsive element.

13. In combination: an element responsive to changes in magnitude of a condition to be controlled and measured and means to measure the response of said element to changes in magnitude of the condition, a control couple embodying a movable member and a cooperating fixed member for the control medium, means for adjusting the position of the movable member relatively to said fixed member, differential mechanism having a part normally stationary and adapted for movement by the said adjusting means, said differential mechanism serving to connect the adjusting means to said movable member and the latter with the responsive element, and means to measure the setting of the adjustment of the movable member of the couple.

14. In combination: an element responsive to changes in magnitude of a condition to be controlled and measured and means to measure the response of said element to changes in magnitude of the condition, a control couple embodying a movable contact member and a cooperating member having two contacts located upon opposite sides of the movable contact member to cooperate therewith, means to adjust the position of the movable member relatively to said contacts, and differential mechanism serving to connect the adjusting means to said movable member and the latter with the responsive element.

15. Adjustment mechanism for a control couple including a fixed member and a movable member, the latter being adapted to be actuated by a member responsive to changes in the magnitude of a condition to be controlled and to assume an optimum position of operation, said mechanism including mechanical means for connection of said movable member to the said responsive member, adjustable means supported independently of said connection means, and means intermediate the latter and the adjustable means whereby when occupying a predetermined relative position, the couple is caused to assume said optimum position.

CARLTON W. BRISTOL.
PERRY A. BORDEN.